US008320044B2

(12) United States Patent
Takahashi et al.

(10) Patent No.: US 8,320,044 B2
(45) Date of Patent: Nov. 27, 2012

(54) OPTICAL ELEMENT AND PRODUCTION METHOD OF THE SAME

(75) Inventors: Hironori Takahashi, Hachioji (JP); Hiroshi Hirayama, Musashino (JP)

(73) Assignee: Konica Minolta Opto, Inc., Tokyo (JP)

( * ) Notice: Subject to any disclaimer, the term of this patent is extended or adjusted under 35 U.S.C. 154(b) by 502 days.

(21) Appl. No.: 12/569,611

(22) Filed: Sep. 29, 2009

(65) Prior Publication Data

US 2010/0085633 A1   Apr. 8, 2010

(30) Foreign Application Priority Data

Oct. 2, 2008  (JP) ................... 2008-257151

(51) Int. Cl.
*G02B 1/10* (2006.01)
*B05D 5/06* (2006.01)

(52) U.S. Cl. ........................................ 359/581; 427/162

(58) Field of Classification Search ................ 359/581, 359/586, 587, 588, 589; 427/162, 166
See application file for complete search history.

(56) References Cited

U.S. PATENT DOCUMENTS

| 6,271,966 | B1* | 8/2001 | Tanabe et al. ............ 359/566 |
| 2001/0004300 | A1* | 6/2001 | Tanaka et al. ............ 359/580 |
| 2004/0005482 | A1* | 1/2004 | Kobayashi et al. ....... 428/702 |
| 2009/0040451 | A1* | 2/2009 | Suzuki ...................... 349/183 |

FOREIGN PATENT DOCUMENTS

JP   2003-73559   3/2003

* cited by examiner

*Primary Examiner* — Alessandro Amari

(74) *Attorney, Agent, or Firm* — Finnegan, Henderson, Farabow, Garrett & Dunner, L.L.P.

(57) ABSTRACT

Disclosed is an optical element for use in an optical apparatus having a light source which emits a light flux with a wavelength $\lambda$ (350 nm $\leq \lambda \leq$ 450 nm), the optical element containing: a molded portion formed by molding a resin; and one or a plurality of anti-reflection layers formed on the molded portion, wherein at least one of the anti-reflection layers is made of $Si_xO_y$; and an elemental ratio r (r=y/x) designating an ratio of O to Si in the molecule of $Si_xO_y$ satisfies a requirement represented by Formula (1): $1.40 \leq r \leq 1.80$.

3 Claims, 1 Drawing Sheet

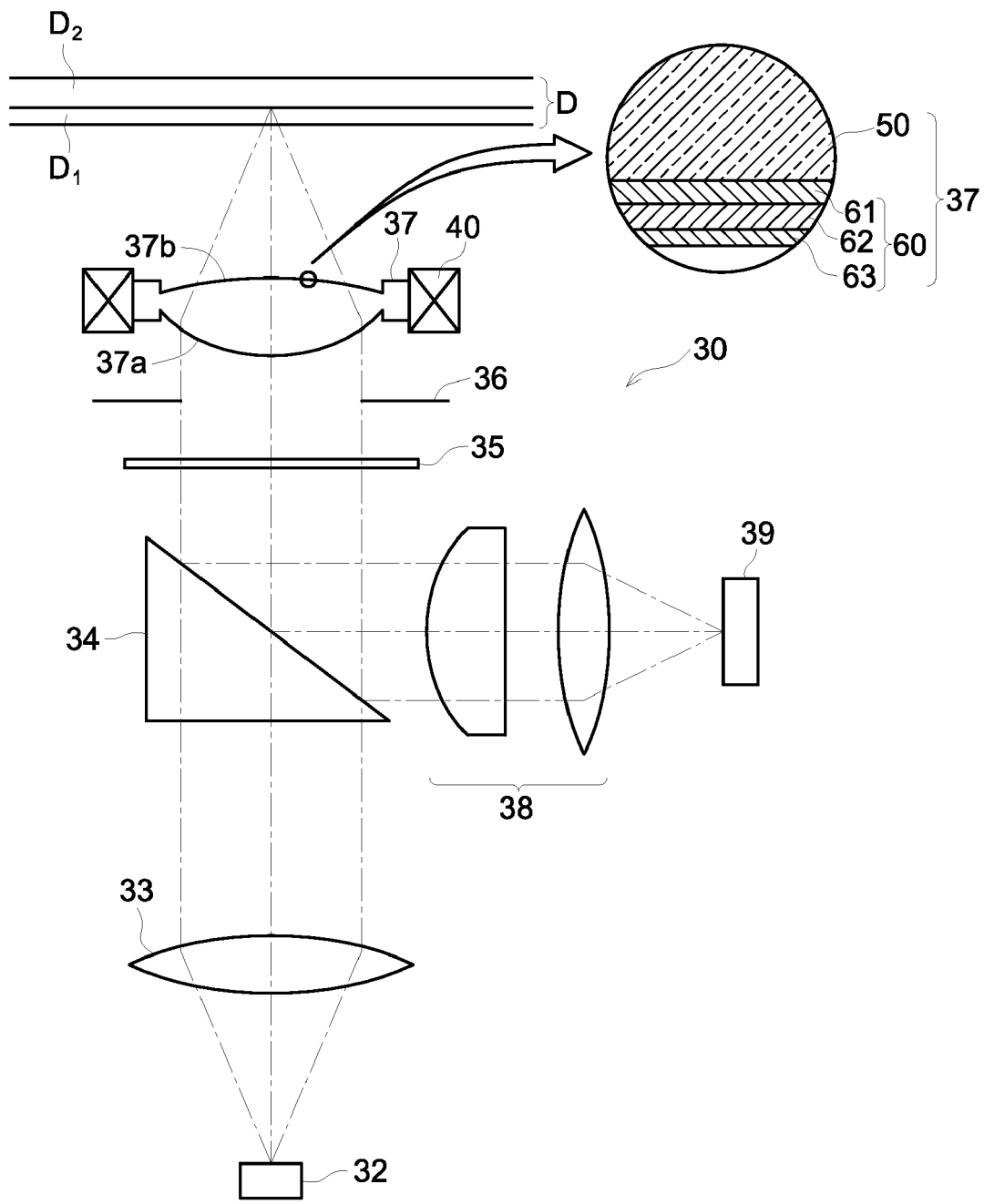

OPTICAL ELEMENT AND PRODUCTION METHOD OF THE SAME

CROSS REFERENCE TO RELATED APPLICATION

This application is based on Japanese Patent Application No. 2008-257151 filed on Oct. 2, 2008 with Japan Patent Office, the entire content of which is hereby incorporated by reference.

TECHNICAL FIELD

The present invention relates to an optical element and a production method thereof. In particular, the present invention relates to an optical element enabling to prevent variation of aberration and decrease of transparency and a production method of the optical element.

BACKGROUND

Until now, glass has been generally used as a composition material of an optical element (mainly lens) from the viewpoint that glass has excellent optical characteristics and mechanical hardness. Miniaturization of an optical element has been required with the advance of miniaturization of an apparatus in which an optical element is used. It is difficult to produce a glass lens having an aspheric form or a complicated form, and glass is becoming an unsuitable material in respect of a mass production of a precise optical element. As a result, a plastic material which can be easily processed has been increasingly examined and used for an optical element. Examples of such plastic material are thermoplastic resins having an excellent transparency (light transmittance), such as polyolefin and polycarbonate.

In recent years, in addition to an optical pickup apparatus used for a CD recording material using a conventional light source emitting a light of about 780 nm, and an optical pickup apparatus used for a DVD recording material using a light source emitting a light of about 650 nm, there has been developed an optical apparatus incorporating an optical pickup apparatus used for a recording material like as Blu-ray disc which is increased a recording density by using a light of a short wavelength from blue to blue-violet in the range of 350 nm to 450 nm and by increasing a number of aperture (NA) of an optical system. When an optical element made of a plastic is used for an optical apparatus having a high NA and using a light source emitting a light of a short wavelength, there have been raised problems of deformation and transformation of an optical element. These problems were caused by strongly focused laser flux as well as a laser having a higher energy than a conventional laser, resulting in an increased stress to the interface of an optical element, and as a result, the materials composing the optical element become unstable. These deformation and transformation are very minute scale and they will not be a level to cause problems in a conventional optical apparatus. However, it was found that in an optical apparatus of high density, they will cause problems to affect the performance of the optical apparatus. In order to solve these problems, it was proposed an optical element made of a polyolefin resin having an alicyclic structure, which has a relatively high transmittance to a blue light and has as high light-fastness (for example, refer to Patent Document 1). However, in order to use as an optical element used for this kind of optical apparatus, there is required to provide an anti-reflection layer so as to prevent a loss of light and a apparition of light diffusion due to a light reflection at a surface of an optical element, even if the light transmittance of a resin material is increased. Consequently, a stress is concentrated at an interface between an anti-reflection layer and a resin, and this will promote to occur the problems as described above. Therefore, further improvement is required.

Patent Document 1: Japanese patent application open to public inspection (JP-A) No. 2003-73559.

SUMMARY

As a result of the investigation by the present inventors, it was found the followings. Deterioration of an optical property caused by the above-described deformation and transformation will arise from concentration of stress by laser irradiation at an interface of a resin substrate and an anti-reflection layer. In addition, it was found that deterioration of an optical property will arise from oxidation of the resin by oxygen which transmits thorough the anti-reflection layer. The inventors tried to provide a functional layer in order to prevent transmission of oxygen. However, it will increase an additional production step and will increase the production cost. Further, such functional layer may decrease the ant-reflection effect of the anti-reflection layer due to the interference effect caused by the difference of refractive index between the functional layer and the resin substrate. Or such functional layer may exhibit absorption in a short wavelength and may result in decreasing of transmittance. Therefore, it was required an optical element which enables to give a stable optical property without decreasing transmittance as an optical element.

As a consequence, an object of the present invention is to provide an optical element excellent having a stable optical property and high transmittance when it is used for an optical pickup apparatus employing a laser source emitting a light of 350 nm to 450 nm. Another object of the present invention is to provide a method for producing the aforesaid optical element.

One of the embodiments of the present invention is as follows.

An optical element for use in an optical apparatus having a light source which emits a light flux with a wavelength $\lambda$ (350 nm $\leq \lambda \leq$ 450 nm), the optical element comprising:

a molded portion formed by molding a resin; and one or a plurality of anti-reflection layers formed on the molded portion, wherein at least one of the anti-reflection layers is made of $Si_xO_y$; and an elemental ratio r (r=y/x) designating a ratio of O to Si in the molecule of $Si_xO_y$ satisfies a requirement represented by Formula (1): $1.40 \leq r \leq 1.80$.

Another embodiment of the present invention is as follows. A method for producing an optical element for use in an optical apparatus having a light source which emits a light flux with a wavelength $\lambda$ (350 nm $\leq \lambda \leq$ 450 nm), the method comprising the steps of:

forming a molded portion of the optical element by molding a resin;

forming one or a plurality of anti-reflection layers on the molded portion, provided that at least one of the anti-reflection layers is made of $Si_xO_y$, wherein, in the step of forming the anti-reflection layer, SiO is used as a vapor deposition source and an inlet gas pressure of an $O_2$ gas introduced in a vapor deposition apparatus is controlled so as to form anti-reflection layer made of $Si_xO_y$; and an elemental ratio r (r=y/x) designating a ratio of O to Si in the molecule of $Si_xO_y$ satisfies a requirement represented by Formula (1): $1.40 \leq r \leq 1.80$.

According to the present invention, it has been achieved the following effects. The optical element of the present invention contains an anti-reflection layer made of $Si_xO_y$ which satisfies the requirement represented by Formula (1). The $Si_xO_y$ layer has a function of capturing transmitting oxygen and reduces the influence of transmitting oxygen to the resin substrate. Accordingly, even if the optical element is used in an optical pickup apparatus employing a laser source emitting a light of 350 nm to 450 nm, appearance of aberration and decrease of transmittance caused by deformation and transformation of the resin substrate can be prevented. By satisfying the requirement of Formula (1), the anti-reflection layer made of $Si_xO_y$ can be used in the same manner as a $SiO_2$ layer which is conventionally used as an anti-reflection layer. An effect to increase an optical transmittance of the optical element can be achieve, and light absorption for a laser light having a wavelength of 350 nm to 450 nm can be reduced. As a consequence, in the structure of the present invention, the optical element is provided with a layer which acts as both an anti-reflection layer and an oxygen transmission preventing layer. This structure enables to achieve an anti-reflection effect, and at the same time, to decrease a newly occurred problem of deterioration of a resin substrate by a short wavelength laser by using a conventional design of an optical element without resulting in increase of the production cost.

BRIEF DESCRIPTION OF THE DRAWING

FIG. 1 is a drawing showing a schematic structure of an optical pickup apparatus which is used in one of the preferred embodiments of the present invention.

DESCRIPTION OF THE PREFERRED EMBODIMENTS

The preferred embodiments of the present invention will be described with reference to a FIGURE.

As is shown in FIG. 1, an optical pickup apparatus 30 of an example of an optical apparatus is provided with a semiconductor laser oscillator 32 as a light source. The semiconductor laser oscillator 32 emits a blue laser (a blue violet laser) of a specific wavelength of from 350 to 450 nm, for example, 405 nm for a BD (Blu-ray Disc). A collimator 33, a beam splitter 34, a ¼ wave length plate 35, an aperture 36 and an objective lens 37 are arranged in sequence on the optical axis of a blue violet light emitted from the semiconductor laser oscillator 32 at a direction away from the semiconductor laser oscillator 32.

A sensor lens group 38 including two lenses, and a sensor 39 are arranged in sequence in a direction orthogonal to the blue violet optical axis at a position closed to the beam splitter 34.

The objective lens 37 is arranged at a position opposing to a high density optical disc D (an optical disc for BD), and a blue violet light emitted from the semiconductor laser oscillator 32 is condensed on a surface of the optical disk D. The objective lens 37 has a two dimensional actuator 40, and the objective lens 37 moves freely on the optical axis according to action of the two dimensional actuator 40.

As is shown in the magnified view in FIG. 1, the objective lens 37 is mainly composed of a molded portion 50, and an anti-reflection layer 60 is formed on a surface 37b of the molded portion 50. The molded portion 50 is molded in a form of a lens shape and it is designed to perform an essential optical function such as a light focusing function.

The molded portion 50 is composed of a thermoplastic resin. Preferable examples of a thermoplastic resin to be used for that are: an acrylic resin, a cyclic olefin resin, a polycarbonate resin, a polyester resin, a polyether resin, a polyamide resin and a polyimide resin. Specifically preferred resin is a cyclic olefin resin. Specifically cited examples are compounds described in JP-A 2003-73559. Preferred compounds among these are listed in the following Table 1.

TABLE 1

| Compound No. | Chemical structure | Refractive index n | Abbe number v |
|---|---|---|---|
| 1 | —(CH₂—C(CH₃)(C(=O)—O—CH₃))— | 1.49 | 58 |
| 2 | (cyclic structure)—CH₂—CH₂— | 1.54 | 56 |
| 3 | (bicyclohexyl)—O—C(=O)—O— | 1.53 | 57 |
| 4 | (bicyclohexyl with C(CH₃)₂ bridge)—O—C(=O)—O— | 1.51 | 58 |

TABLE 1-continued

| Compound No. | Chemical structure | Refractive index n | Abbe number v |
|---|---|---|---|
| 5 | | 1.52 | 57 |
| 6 | | 1.54 | 55 |
| 7 | | 1.53 | 57 |
| 8 | | 1.55 | 57 |
| 9 | | 1.54 | 57 |
| 10 | | 1.55 | 58 |
| 11 | | 1.55 | 53 |
| 12 | | 1.54 | 55 |
| 13 | | 1.54 | 56 |
| 14 | | 1.58 | 43 |

From the viewpoint of keeping size stability used for an optical material, it is preferable that the above-described thermoplastic exhibit a water absorbing ratio of 0.2% or less. Therefore, specifically preferred resins include: a polyolefin resin (for example, polyethylene and polypropylene); a fluororesin (for example, polytetrafluoroethylene, TEFLON AF (registered trademark, made by Du Pont Co., Ltd.); a cyclic olefin resin (for example, ZEONEX (made by Zeon Corporation), APEL (made by Mitsui Chemicals Inc.), ARTON (made by JSR Corporation) and TOPAS (made bay Ticona Corporation)); an indene/styrene resin; and a polycarbonate resin.

The anti-reflection layer 60 in the present embodiment contains a 3 layered structure. However, the layer structure of the anti-reflection layer is not particularly limited in the preset invention as long as the anti-reflection layer contains a $Si_xO_y$ layer in which X and Y satisfy the above-described relationship represented by Formula (1). The anti-reflection layer may be a single layer or may be a multi-laminated layer. At least one $Si_xO_y$ layer satisfying the above-describe relationship represented by Formula (1) is required to be provided, however, it is preferable to be provided with a plurality of $Si_xO_y$ layers as constituting layers to form ant-reflection layers. It is possible to suitably determine the number of the ant-reflection layers in accordance with the required amount of the ant-reflection effects. In the present embodiment, the first layer 61 is directly formed on the molded portion 50, the second layer 62 is formed on the first layer 61, and then, the third layer 63 is formed on the second layer 62.

The first layer 61 of the anti-reflection layers 60 in the present embodiment is composed of a low refractive material having a refractive index of less than 1.7. Preferably, the first layer 61 is composed of $Si_xO_y$. In the first layer 61, an elemental ratio of O to Si, indicated as r (r=y/x), satisfies the requirement represented by Formula (1). The elemental ratio r is a value calculated from the amounts of elements obtained with an XPS method (an X-ray photoelectron spectroscopy) by using ESCALAB200R (made by VG Scientific Corporation (Great Britain)).

$$1.40 \leq r \leq 1.80 \qquad \text{Formula (1)}$$

In the $Si_xO_y$ layer of the present invention, it is required that Formula (1) is satisfied. When the elemental ratio r is less than 1.40, absorption of light in the short wavelength, which is characteristic of SiO (Silicon monooxide) becomes large. This is not preferable. On the other hand, when the elemental ratio r is larger than 1.80, it is difficult to achieve the required effect of preventing the appearance of aberration caused by deformation and transformation of the molded portion 50, or it is difficult to achieve the required effect of preventing the decrease of transparency.

The second layer 62 of the anti-reflection layers 60 in the present embodiment is composed of a high refractive material having a refractive index of larger than 1.7. The high refractive material is not specifically limited and any materials having a required refractive index can be used. Preferable examples of a high refractive index include: $Ta_2O_5$, a mixture of $Ta_2O_5$ and $TiO_2$, $ZrO_2$, and a mixture of $ZrO_2$ and $TiO_2$. In addition to these, $TiO_2$, $Nb_2O_3$ and $HfO_2$ can also be used.

The third layer 63 of the anti-reflection layers 60 in the present embodiment is composed of a low refractive material having a refractive index of less than 1.7. It may be a $Si_xO_y$ layer which satisfies the relationship represented by Formula (1), or it may be composed of a low refractive material such as $SiO_2$ and $MgF_2$.

It is required that the objective lens 37 contains at least a first layer 61 in the anti-reflection layer 60. When the anti-reflection layer is composed of a plurality of layers, the $Si_xO_y$ layer which satisfies the relationship represented by Formula (1) may be the first layer (located at the nearest position to the substrate), or it may be located at the farther position from the substrate. A plurality of the $Si_xO_y$ layers may be provided. In the present embodiment, the anti-reflection layer 60 is formed on a surface 37b of the objective lens though which the light exits. The anti-reflection layer 60 may be formed on a surface 37a of the objective lens though which an incident light enters. It may be possible that the anti-reflection layers 60 are formed on both surfaces 37a and 37b. A light flux tends to be focused on the objective lens resulting in increasing the density of light at the side of a surface though which the light exits. Therefore, it is preferable that an anti-reflection layer containing $Si_xO_y$ satisfying the relationship represented by Formula (1) is provided on the surface of 37b (the side though which light exits), or it is preferable that the above-mentioned two anti-reflection layers are provided on both sides of the objective lens.

Then, the production method of the objective lens 37 will be described.

At first, the above-described thermoplastic resin is injected in a mold under the predetermined conditions to from a molded portion 50 having a specific structure.

Then, an anti-reflection layer 60 (a first layer 61) is formed on one surface of the molded portion 50 with a method such as vapor deposition method. More specifically, in order to form the first layer 61, SiO which has a less ratio of oxygen atom than $SiO_2$ is used as an evaporation source, and an oxygen gas ($O_2$) is introduced in a vapor deposition apparatus. The inlet gas pressure of the oxygen gas ($O_2$) is controlled to a predetermined value so as to form the first layer 61 which satisfies the requirement represented by Formula (1).

The second layer 62 is successively formed on the first layer 61 by using an evaporation source to form the second layer 62. For example, in order to form a second layer 62 composed of $Ta_2O_5$ and 5% of $TiO_2$, OA600 (made of OPTRON Co., Ltd.) is used as an evaporation source and the second layer 62 can be suitably formed by heating the evaporation source with an electronic gun. During vapor deposition to form the layer, it is preferable that the pressure in the vapor deposition apparatus is controlled to become $1.0 \times 10^{-2}$ Pa by introducing an oxygen gas and the vapor deposition rate of the layer is controlled to be 5 Å/sec. The layer forming temperature (the temperature in the vapor deposition apparatus) is kept to be in the appropriate range.

The third layer 63 is successively formed on the second layer 62 by using an evaporation source to form the third layer 63. For example, in order to form the third layer 63 composed of $SiO_2$, it is preferable that the pressure in the vapor deposition apparatus is controlled to become $1.0 \times 10^{-2}$ Pa by introducing an oxygen gas and the vapor deposition rate of the layer is controlled to be 5 Å/sec. The layer forming temperature (the temperature in the vapor deposition apparatus) is kept to be in the appropriate range.

As is described above, the objective lens 37 is produced.

A function of the optical pickup apparatus 30 will be described.

A blue violet ray is emitted from the semiconductor laser oscillator 32 during recording the information into the optical disk D or during playback of the information recorded in the optical disk D. The emitted blue violet ray is collimated to an infinite parallel ray through the collimator 33, then is transmitted through the beam splitter 34 and the ¼ wave length plate 35. The blue violet ray further forms a condensed light spot on an information recording surface $D_2$ through a protective substrate $D_1$ of the optical disc D after transmission through the aperture 36 and the objective lens 37.

The blue violet ray after forming the condensed light spot is modulated by information bit at the information recording surface $D_2$ of the optical disc D and is reflected by the information recording surface $D_2$. The reflected light goes through the objective lens 37 and the aperture 37 in sequence, and its polarization direction is changed by the ¼ wave length plate 35, and it is reflected by the beam splitter 34. Astigmatism is given to the reflected light during going through the sensor lens group 38, accepted by the sensor 39 and converted to electric signal via photoelectric conversion by the sensor 39.

By repeating the operation as described above, the recording the information into the optical disk D or the playback of the information recorded in the optical disk D can be performed.

According to the above-described embodiment of the present invention, the anti-reflection layer 60 contains the first layer 61 composed of $Si_xO_y$. The first layer satisfies the requirement represented by Formula (1), and the existing ratio of O to Si is less than 2. This will result in producing the effect to absorb oxygen in the atmosphere by the first layer 61. As a result, it is hard that the oxygen in the atmosphere will penetrate through the anti-reflection layer 60 to reach the molded portion 50 made of a resin. The oxidation of the molded portion 50 can be prevented, and as a consequence, the variation of aberration and the decrease of transparency of the objective lens will be restrained (refer to the following Examples).

EXAMPLES

Example 1

(1) Preparation of Samples

Anti-reflection layers were formed on each surface of a light incident side and a light exit side of a resin lens substrate (an objective lens for Blu-ray) made of a cyclic olefin resin (APEL; manufactured by Mitsui Chemicals Inc.). The formed anti-reflection layers were a mono layer made of $Si_xO_y$, and have a thickness as indicated in Table 2.

The anti-reflection layers for each sample were produced with a vapor deposition method. During formation of these layers, the evaporation source and the inlet pressure of the oxygen gas were suitably changed so as to produce 5 kinds of samples. They were named as Sample Nos. 1 to 5. The vapor deposition conditions for Sample Nos. 1 to 5 are indicated in Table 2. In Table 2 are shown the thickness of the anti-reflection layers and the elemental ratio r of O to Si (the value of y/x in $Si_xO_y$).

In Table 2, the elemental ratio r is calculated from the amounts of elements obtained with an XPS method (an X-ray photoelectron spectroscopy) by using ESCALAB200R (made by VG Scientific Corporation (Great Britain)). The layer thickness is adjusted so that the value of "refractive index (n)" multiplied by "layer thickness (d)" (nd) becomes about the value of the wavelength/4, in which the wavelength is a designed value. By adjusting the value of nd to be the wavelength/4, it is possible to obtain an anti-reflective effect caused by an effect of interference of light. Here, in order to determine a designed wavelength (the wavelength which is planned to exhibit the lowest reflectance), the structure of a lens surface and a transparency were taken into consideration. The layer thickness was decided based on the wavelength 470 nm on a light incident side (S1 surface side) and 440 nm on a light exit side (S2 surface side).

(2) Evaluation of Samples (2.1) Measurement of Variation of Aberration

Sample Nos. 1 to 5 each were irradiated with a laser source emitting a light of 405 nm at a temperature of 75° C., with a power of 10 mW, an irradiation spot diameter of 1 mm for 1,000 h of irradiation time. The amount of variation value between before and after the irradiation of laser was measured for each of Sample Nos. 1 to 5. The measurement was done using Twyman-Green interferometer. The criterion value for the amount of variation in spherical aberration (ΔSA3) was set to be less than ±0.03 rms, and Sample Nos. 1 to 5 were evaluated whether this criterion value was satisfied or not. The evaluation results are shown in Table 2. In Table 2, when the criterion value was satisfied, the evaluation was indicated as "A", and when it was not satisfied, the evaluation was indicated as "B".

(2.2) Evaluation of Transparency of the First Layer (Necessary Conditions for Applying to an Anti-Reflection Layer)

The same silicon oxide layer as the first layer of Sample Nos. 1 to 5 was produced on an optical glass BK7 so as to have a thickness of 100 nm. An absorbance of light of the silicon oxide layer in the range of 350 to 450 nm was measured using a spectrophotometer U4100 (made by Hitachi High-Technologies Corporation). A criteria of transparency was set to be 2% regarding an amount of absorbance of light in the range of 350 to 450 nm. The evaluation results are shown in Table 2. When the sample exhibited an amount of absorbance of light to be less than 2%, the sample is indicated as "A". On the other hand, when the sample exhibited an amount of absorbance of light to be 2% or more, the sample is indicated as "B".

TABLE 2

| Sample No. | Evaporation source | Inlet pressure of the oxygen gas [Pa] | Elemental ratio in $Si_xO_y$ (r = y/x) | Layer thickness of anti-reflection layer (S1) [nm] | Layer thickness of anti-reflection layer (S2) [nm] | Variation of aberration (ΔSA3) | Transparency |
|---|---|---|---|---|---|---|---|
| 1 (Inv.) | SiO | $3.0 \times 10^{-2}$ | 1.40 | 75.71 | 70.76 | A | A |
| 2 (Inv.) |  | $1.5 \times 10^{-2}$ | 1.75 | 78.02 | 72.94 | A | A |
| 3 (Comp.) | $SiO_2$ | $2.7 \times 10^{-2}$ | 1.90 | 78.86 | 73.67 | B | A |
| 4 (Comp.) | SiO | $5.0 \times 10^{-3}$ | 1.20 | 67.88 | 63.42 | A | B |
| 5 (Comp.) |  | $1.5 \times 10^{-3}$ | 0.85 | 65.17 | 60.87 | A | B |

Inv.: Inventive Example, Comp.: Comparative Example (3) Conclusion

As are shown in Table 2, Sample Nos. 1 and 2 each having an elemental ratio r in the range of 1.40≦r≦1.80 yielded good evaluation results for variation of aberration and transparency. In contrast, Sample No. 3 having an elemental ratio r of more than 1.80 yielded a large amount of variation of aberration, and Sample Nos. 4 and 5 having an elemental ratio r of less than 1.40 yielded a large amount of absorbance of light in the range of a short wavelength (from 350 nm to 450 nm). From these evaluation results, it is evident that adjusting an elemental ratio r in the first layer (composed of $Si_xO_y$) of the anti-reflection layer to be in the range of 1.40≦r≦1.80 is specifically effective to achieve the required amount of variation of aberration and transparency.

Example 2

(1) Preparation of Samples

Anti-reflection layers were formed on each surface of a light incident side and a light exit side of a resin lens substrate (an objective lens for Blu-ray) made of a cyclic olefin resin (APEL; manufactured by Mitsui Chemicals Inc.) that was prepared in the same manner as in Example 1. The formed anti-reflection layers have thicknesses as are listed in Table 3. In Table 3, the layer located in the nearest position to the lens substrate is designated as "an under layer". The layer located in the furthest position from the lens substrate is designated as "an upper layer". These two layers contain silicon oxide having the same elemental ratio r (r is a ratio of y/x, x and y each being a value in $Si_xO_y$). A zirconium oxide layer having a refractive index of 1.93 for the light of 400 nm is used as an interlayer. In order to determine a designed wavelength (the wavelength which is planned to exhibit the lowest reflectance), the structure of a lens surface and a transparency were taken into consideration. The layer thickness was decided based on the wavelength 470 nm on a light incident side (S1 surface side) and 440 nm on a light exit side (S2 surface side).

(2) Evaluation of Samples (2.1) Measurement of Variation of Aberration

Sample Nos. 6 to 8 each were subjected to measurement of variation in spherical aberration (ΔSA3) under the same conditions as in Example 1. In addition to the criterion value set in Example 1, a second criterion value of ±0.01 rms was used for evaluation. When variation in spherical aberration (ΔSA3) is less than ±0.01 rms, it was indicated as "S". The evaluation results are shown in Table 3.

(2.2) Evaluation of Transparency of the Anti-Reflection Layer (Necessary Conditions for Applying to an Anti-Reflection Layer)

Sample Nos. 6 to 8 each were evaluated in the same manner as in Example 1. The evaluation results are shown in Table 3.

TABLE 3

| | Sample No. | | | | | |
|---|---|---|---|---|---|---|
| | 6 (Inventive Example) | | 7 (Inventive Example) | | 8 (Comparative Example) | |
| | S1 surface (light incident side) | S2 surface (light exit side) | S1 surface (light incident side) | S2 surface (light exit side) | S1 surface (light incident side) | S2 surface (light exit side) |
| Silicon oxide layer (Upper layer) [nm] | 99.36 | 91.83 | 101.75 | 94.81 | 103.78 | 95.66 |
| Zirconium oxide layer [nm] | 25.00 | 25.00 | 25.00 | 25.00 | 25.00 | 25.00 |
| Silicon oxide layer (Under layer) [nm] | 75.71 | 70.76 | 78.02 | 72.94 | 78.86 | 73.67 |
| Elemental ratio of $Si_xO_y$ in Silicon oxide layer (r = y/x) | 1.4 | | 1.75 | | 1.9 | |
| Variation of aberration | S | S | S | S | B | B |
| Transparency | A | A | A | A | A | A |

(3) Conclusion

As are shown in Table 3, Sample Nos. 6 and 7 each having an elemental ratio r in the range of $1.40 \leq r \leq 1.80$ and provided with two silicon oxide layers yielded good evaluation results for variation of aberration. It was shown that when the sample is provided with a plurality of silicon oxide layers as described above the sample was proved to yield specific good results of the present invention.

What is claimed is:

1. An optical element for use in an optical apparatus having a light source which emits a light flux with a wavelength λ (350 nm $\leq \lambda \leq$ 450 nm), the optical element comprising:
    a molded portion formed by molding a resin made of a cyclic olefin resin; and
    an anti-reflection film formed on the molded portion,
    wherein the anti-reflection film comprises at least two anti-reflection layers which are made of $Si_xO_y$; and
    an elemental ratio r (r=y/x) designating a ratio of O to Si in the molecule of $Si_xO_y$ satisfies a requirement represented by Formula (1):

$1.40 \leq r \leq 1.80.$    Formula (1)

2. The optical element described in claim 1,
    wherein the optical element is an objective lens in an optical pickup apparatus.

3. A method for producing an optical element for use in an optical apparatus having a light source which emits a light flux with a wavelength λ (350 nm $\leq \lambda \leq$ 450 nm), the method comprising the steps of:
    forming a molded portion of the optical element by molding a resin made of a cyclic olefin resin;
    forming an anti-reflection film on the molded portion, provided that the anti-reflection film comprises at least two anti-reflection layers which are made of $Si_xO_y$,
    wherein, in the step of forming the anti-reflection film, SiO is used as a vapor deposition source and an inlet gas pressure of an $O_2$ gas introduced in a vapor deposition apparatus is controlled so as to form the anti-reflection layers made of $Si_xO_y$; and
    an elemental ratio r (r=y/x) designating a ratio of O to Si in the molecule of $Si_xO_y$ satisfies a requirement represented by Formula (1):

$1.40 \leq r \leq 1.80.$    Formula (1)

* * * * *